Feb. 15, 1927.  
V. B. NUCKOLS  
1,617,494  
FOLDING WIRE BASKET  
Filed Feb. 20, 1926
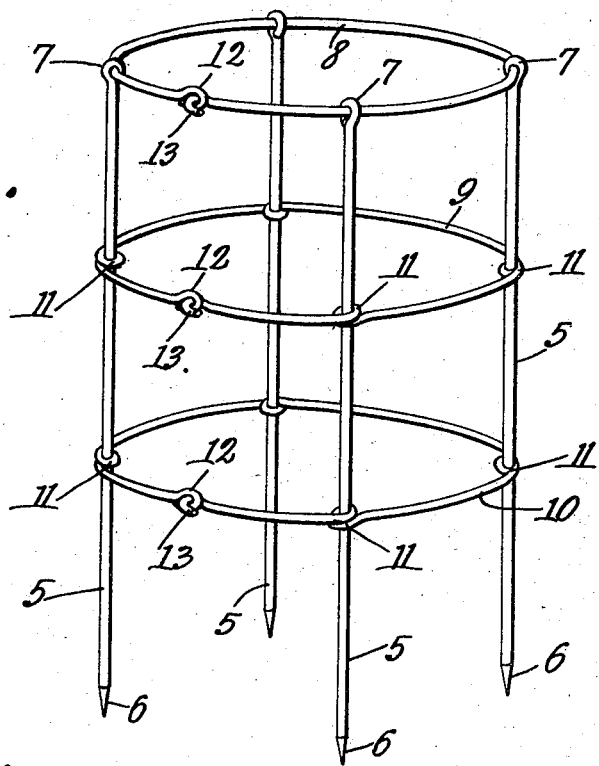
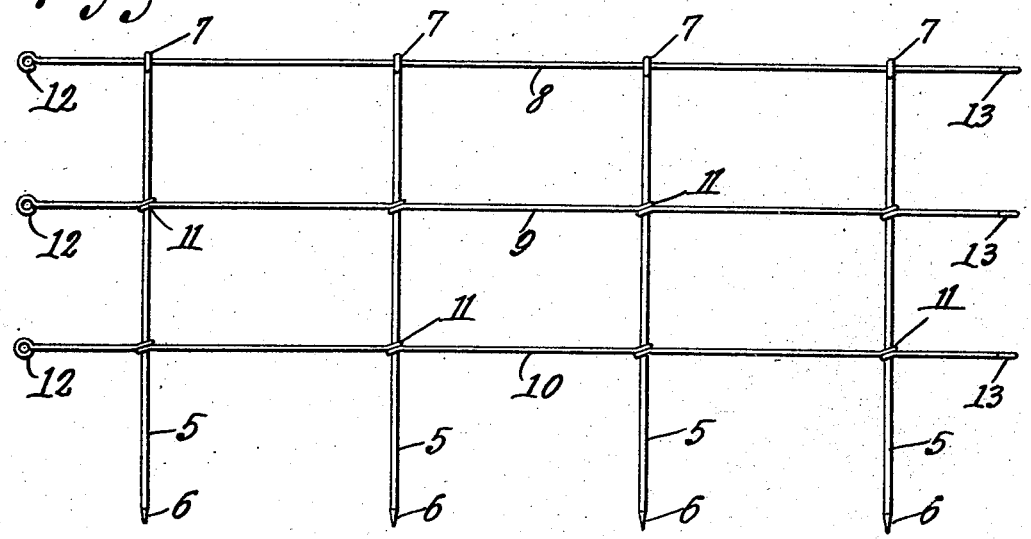
Virgil B. Nuckols, Inventor  
By C.A.Snow & Co.  
Attorneys Patented Feb. 15, 1927.

1,617,494

UNITED STATES PATENT OFFICE.

VIRGIL B. NUCKOLS, OF ELKTON, KENTUCKY.

FOLDING WIRE BASKET.

Application filed February 20, 1926. Serial No. 89,713.

This invention relates to a frame or support especially designed for use in supporting tomato vines or the like to hold the tomatoes out of contact with the ground surface, eliminating any chance of the tomatoes rotting by their contact with the ground surface.

Another important object of the invention is to so support the vine that the tomatoes will be exposed to the sunlight so that the same may ripen evenly.

A still further object of the invention is to provide a device of this character which will spread when the ends of the support have been disconnected, to the end that the support will lie flat to facilitate storing.

Another object of the invention is the provision of a support wherein the flexibility of the wire of which the support is constructed or the stays of which the frame is made, will act to exert a pull at the points of connection of the ends of the support to hold the device in its active position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention and that some may be constructed of wooden stakes threaded through the stakes and tied.

Referring to the drawing—

Figure 1 is a perspective view illustrating a supporting device constructed in accordance with the invention and showing the same in its active position.

Figure 2 is a view illustrating the device in an extended position. the ends being disconnected.

Referring to the drawing in detail, the device includes a plurality of vertical supporting rods 5 which have their lower ends tapered as at 6 to provide piercing extremities whereby the device may be forced into the ground surface with facility.

At the upper ends of the members 5 are eyes 7 through which the rod 8 extends and in which the rod 8 is held in such a way as to prevent movement of the rod 8 with respect to the members 5.

Arranged in vertical spaced relation with each other are the rods 9 and 10 respectively which rods are provided with looped portions 11 which closely engage the members 5 to secure the members 9 and 10 against movement longitudinally of the members 5.

Formed at one end of each of the rods 8, 9 and 10, is an eye 12, which eyes are designed to receive the hook portions 13 formed at the opposite ends of the rods 8, 9 and 10 so that when the hook portions are positioned within the eyes, the supporting device will assume a form circular in plan to the end that when the device is positioned around a plant, the leaves and stalks of the plant may grow upwardly and overhang the support.

It might be further stated that the rods 8, 9 and 10 are constructed of such flexible metal that they will extend themselves to a position as shown by Figure 2 when the hooks 13 and eyes 12 are disengaged, the flexibility of the rods 8, 9 and 10 also acting to exert a pull at the hook and eye connection and eliminate any possibility of wind blowing against the plant supported by the device, moving the hook members to disengage them.

Due to the construction, it will be noted that when the device is extended as shown by Figure 2 the supporting devices may be piled one upon another to facilitate storing without fear of bending or breaking the structure.

I claim:—

In a device of the character described, a plurality of vertical supporting rods having eyes formed at their upper ends and having their opposite ends tapered, a rod extended through the eyes at the upper ends of the rods, one end of the rod having an eye, the opposite end of the rod being formed into a hook to be positioned within the eye to secure the ends together, rods disposed intermediate the ends of the supporting rods and having portions thereof looped around the supporting rods, one of the respective ends of each of the last mentioned rods being formed into an eye, the opposite ends being formed into hooks to engage the eyes and secure the ends of the last mentioned rods together.

In testimony that I claim the foregoing as my own, I have hereto affixed my signature.

VIRGIL B. NUCKOLS.